2,968,537

MANUFACTURE OF ACTIVATED REFRACTORY INORGANIC OXIDES

William G. Nixon, Westchester, Ill., assignor, by mesne assignments, to Universal Oil Products Company, Des Plaines, Ill., a corporation of Delaware No Drawing. Filed Sept. 12, 1958, Ser. No. 760,546

2 Claims. (Cl. 23—293)

The present invention relates to processes for manufacturing refractory inorganic metal oxides; it is specifically directed to an improvement in such processes, and particularly in those processes for manufacturing refractory inorganic oxides comprising alumina. The utilization of the method of the present invention results in an activated inorganic metal oxide which is highly suited for utilization as catalytic material in and of itself, as a carrier material for other catalytically active metallic components, or as an absorbing medium when employed as a desiccant or other suitable treating agent, or in processes for the separation of various organic compounds.

Refractory inorganic metal oxides are widely employed throughout many types of commercial industries; they are particularly utilized in the chemical and petroleum industries as a carrier material for catalytic composites, or, in some instances, as a catalyst in and of themselves. Inorganic metal oxides, including alumina, silica, magnesia, thoria, boria, titania, zirconia, etc., and mixtures thereof, are generally employed, without the addition thereto of catalytically active metallic components, as dehydrating, treating or purifying agents. The inherently high degree of porosity, possessed by the refractory inorganic oxides, is one of the most prominent factors affecting their use in removing solid contaminants from liquid and gaseous streams, liquid contaminants from gaseous streams, etc. The refractory metal oxides most frequently employed, for their high adsorptive capacity, are alumina, silica, and mixtures thereof. The addition of other refractory inorganic oxides such as magnesia, thoria, boria, titania, etc. is usually carried out while manufacturing catalytic composites in order to impart thereto certain desired physical characteristics, these inducing particular effects upon the reactions to be promoted.

The object of the present invention is to produce a refractory inorganic metal oxide, particularly alumina and/or silica, having exceptionally high adsorptive capacities when serving as either a carrier material for other catalytically active components, or as a treating or purifying agent, or desiccant.

In one embodiment, the present invention provides an improvement in processes for manufacturing a refractory inorganic metal oxide, which improvement comprises contacting the metal oxide at a temperature in excess of 25° C. with carbon monoxide.

In another embodiment, the present invention relates to an improvement in those processes for manufacturing refractory inorganic oxides wherein a refractory inorganic metal oxide is subjected to high-temperature calcination in the presence of a free oxygen-containing gaseous material, which improvement comprises causing the metal oxide to contact, at a temperature in excess of 25° C., with carbon monoxide, in the absence of said free oxygen-containing gaseous material.

In still another embodiment, the present invention provides a method for manufacturing a catalyst which comprises preparing a refractory inorganic metal oxide, contacting said metal oxide, at a temperature within the range of from about 100° C. to about 600° C., with carbon monoxide, thereafter calcining said carrier material in the presence of a free oxygen-containing gaseous material and subsequently impregnating the calcined metal oxide with a catalytically active metallic component.

Specifically, the present invention provides a method for manufacturing a catalytic composite comprising alumina and platinum, which method comprises contacting alumina, at a temperature within the range of from about 100° C. to about 600° C., with carbon monoxide, thereafter calcining said alumina in the presence of a free oxygen-containing gaseous material and subsequently impregnating the calcined alumina with a platinum component.

Although the method of the present invention is applicable to the manufacture of a multitude of refractory inorganic oxides, which have been hereinabove set forth, in the interest of simplicity and brevity, the following is limited to the manufacture of alumina, alumina when utilized with other of the refractory inorganic metal oxides, or alumina when employed as a carrier material in manufacturing catalytically active composites. It is understood, however, that it is not intended to limit unduly the present invention beyond the scope and spirit of the appended claims. It is further understood that the method of the present invention may be utilized to advantage in the preparation of refractory inorganic metal oxides possessing high adsorptive capacity, whether alumina, alumina-silica, silica, and other refractory inorganic oxides either alone or in combination with the alumina and/or silica.

In the specification and the appended claims, the term "alumina" is employed to mean aluminum oxide in all states of oxidation and in all states of hydration, as well as aluminum hydroxide. The alumina may be synthetically prepared or naturally occurring, and may be of the crystalline or gel type. Alumina exists in various modifications, which modifications are known as alpha-alumina, gamma-alumina, epsilon-alumina, and which are of the mono- or tri-hydrate form. The various forms of alumina are known by many trivial and trade names such as Gibbsite, Boehmite, Bayerite and Diaspore, and it is intended to include all such forms.

The alumina, to be improved through the utilization of the method of the present invention, may be manufactured through the utilization of any of the well-known methods of manufacture. Alumina may be prepared, for example, by adding a suitable alkaline reagent such as ammonium hydroxide to a salt of aluminum metal, such as the chloride, the sulfate, the carbonate, etc., in an amount to form aluminum hydroxide which, upon drying, is converted to alumina. Other refractory inorganic oxides, particularly silica, may be added to the alumina through any suitable manner including separate, successive or co-precipitation means. A preferred form of alumina is the sphere, and alumina spheres may be continuously manufactured by passing droplets of an alumina hydrosol into an oil bath maintained at an elevated temperature, retaining the droplets within said oil bath until they set to firm hydrogel spheroids. The spheres are continuously withdrawn from the oil bath, and immediately thereafter subjected to specific aging treatments for the purpose of imparting thereto certain desired physical characteristics. It is not essential to the method of the present invention that the alumina be prepared in any particular manner; the methods hereinabove set forth are intended to be illustrative rather than restrictive upon the present invention.

When utilized as a carrier material for catalysts containing one or more catlaytically active metallic components, the refractory inorganic oxide, and particularly alumina, prepared in accordance with the present invention, results in a more active catalyst than has been heretofore obtained. In addition, the catalyst indicates a high degree of stability, or the capability of performing its intended function for an extended period of time. This increased activity and stability appears to be due to the resulting increased surface area, and decreased pore diameter, of the inorganic oxide employed as the carrier material. Whatever catalytically active metal components are combined therewith, the result is a more homogenous catalyst, and one in which the active metallic components are more thoroughly integrated throughout the inorganic oxide particles.

The refractory inorganic oxide, prepared in accordance with the embodiments of the present invention, is especially suited for use as the carrier material in the manufacture of catalysts employed in the reforming of hydrocarbons, although, as hereinbefore set forth, the use of a catalyst containing an inorganic oxide prepared through the utilization of carbon monoxide, is not limited to the manufacture of such catalysts. The method of the present invention will produce a catalyst possessing a greater degree of activity and stability, regardless of the industry in which such catalyst is ultimately employed.

Although the method of the present invention is particularly advantageous when utilized in manufacturing catalysts for the purpose of effecting the reforming of hydrocarbons, which catalysts generally contain a platinum component and a combined halogen component, other catalytic composites comprising a wide variety of metallic components may be advantageously affected. Catalytic composites which can be manufactured to possess a high degree of activity and stability, through the utilization of carbon monoxide, comprise active metal components such as iridium, palladium, ruthenium, rhodium, vanadium, chromium, cobalt, copper, molybdenum, nickel, other metals of groups VI and VIII of the periodic table, mixtures of two or more, etc. The metallic component may exist as the element, or in combination as the halide, oxide, sulfide, sulfate, etc. It is understood that the benefits afforded catalytic composites containing different active metal components are not equivalent, and that the effects of employing the method of the present invention in conjunction with a particular catalytic composite are not necessarily the same effects observed with other catalysts. It is further understood that the method of the present invention is not unduly restricted to the manufacture of refractory inorganic oxides for use as carrier materials in the subsequent manufacture of catalytic composites. The essential feature of the present invention is the utilization of carbon monoxide in the process of manufacturing the refractory inorganic oxide; the ultimate use, for which the inorganic oxide is intended, is not necessarily a limitation upon the present invention.

The exact nature of the pehnomenon, effected through the action of carbon monoxide, creating the change in the surface-area characteristics of the inorganic oxide is not known precisely. It has been shown, as hereinafter set forth, that the treatment with carbon monoxide yields a refractory inorganic oxide with improved surface-area characteristics, whether the inorganic oxide is first prepared by a suitable, well-known method, or the carbon monoxide treatment is made an integral portion of such method. Preferably the inorganic oxide is contacted, in accordance with the method of the present invention, with carbon monoxide prior to subjecting the inorganic oxide to high temperature calcination in the presence of air. Most of the methods of manufacture employed at the present, yield a refractory oxide which is substantially saturated with water. The oxide is necessarily dried, at temperatures within the range of about 100° C. to about 200° C. and calcined in the presence of air at higher temperatures. The preferred method of the present invention is to cause the wet refractory material to contact the carbon monoxide, and, following a brief purge with nitrogen to remove traces thereof, to subject the oxide to high-temperature calcination. The length of the carbon monoxide treatment, as well as the concentration, or total amount, of carbon monoxide passing through the refractory material would be dependent upon the quantity of material to be so treated, the amount of water, both free and combined, contained within the refractory material, the means employed to disperse the carbon monoxide throughout the refractory material, etc. The determination of the quantity of carbon monoxide, which is to be employed, can readily be made by one skilled in the art, when such considerations are taken into account. It appears that there exists a finite stage, during the carbon monoxide treatment, at which stage the maximum change in surface area characteristics has taken place. Any further treatment with carbon monoxide would be uneconomical, and no advantage in utilizing an excess of carbon monoxide is readily foreseeable. It appears that the carbon monoxide treatment has reached its maximum effectiveness when the refractory material through which it is being dispersed has become substantially free from water.

The following examples are given for the purpose of illustrating the method of the present invention, and to indicate more fully the benefits to be derived through the utilization thereof. It is not intended to limit unduly the scope of the present invention to the particular reagents, processing conditions and/or concentrations employed within the examples. Insignificant modifications, within the scope and spirit of the appended claims, will become readily apparent to those skilled in the art of manufacturing refractory inorganic oxide material, and particularly in the art of manufacturing alumina.

*Example I*

Aluminum chloride hexahydrate, in an amount of 245 grams, was dissolved in 2000 milliliters of water. Ammonium hydroxide was added to the resulting aqueous solution until a heavy white precipitate resulted. The precipitate was recovered in the form of a filter cake, to which was added a 1% by weight solution of ammonium hydroxide; the resulting mixture was again subjected to filtration to recover the heavy precipitate in the form of a firm filter cake. The alumina filter cake was washed with water and thereafter dried at a temperature of 250° F. for a period of three hours. The dried alumina was placed in a glass furnace tube wherein it was subjected to high-temperature calcination at 500° C. for a period of one hour; the calcination procedure employed 300 cubic centimeters of air per minute. The furnace tube was allowed to cool to room temperature, the calcined alumina being removed and subjected to analysis to determine its surface area.

Thirty cubic centimeters of the alumina, prepared as hereinabove described, was dried at a temperature of 250° F. and placed in a second glass furnace tube. Following a high-temperature calcination at 500° C., the furnace tube was purged for five minutes with nitrogen to remove traces of air, thereafter being treated with carbon monoxide at a rate of 100 cubic centimeters per minute for 45 minutes to a temperature of 500° C. The nitrogen purge was employed to preclude the formation of carbon dioxide through the commingling of carbon monoxide and the traces of free oxygen contained in the air. Following the treatment with carbon monoxide, the alumina was again purged with nitrogen, and air-oxidized for 30 minutes at a temperature of 500° C. The furnace tube was cooled to room temperature and the alumina therein removed for the analysis of its surface area.

The analyses indicated that the alumina, prepared in the absence of carbon monoxide, possessed a surface area of 282 square meters per gram, whereas the carbon monoxide-treated alumina indicated a surface area of 328 square meters per gram. The method of the present invention resulted in an increase in surface area characteristics of 16%.

*Example II*

160 cubic centimeters of alumina spheres, prepared in accordance with the oil-drop method, hereinbefore described, were divided into two portions of 80 cubic centimeters each. The first portion was placed in a furnace tube and treated, to a temperature of 500° C., with carbon monoxide at a rate of 50 cubic centimeters per minute and for an additional period of one hour at 500° C. Traces of carbon monoxide were removed by passing a stream of nitrogen through the alumina, the spheres being cooled to room temperature thereby. The second portion of alumina spheres were dried at a temperature of about 250° F., and thereafter subjected to air oxidation to a temperature of 500° C.

The surface area characteristics were determined as 201 square meters per gram for the air oxidized portion of alumina spheres, and 245 square meters per gram for that portion which was treated with carbon monoxide. The utilization of carbon monoxide on alumina which had not previously been dried or calcined, resulted in an increase in surface area of 21.9%. Of further significance is the fact that the pore diameter of the alumina spheres which had been treated with carbon monoxide was substantially smaller than the pore diameter (determined in angstroms) of the untreated alumina spheres. There was indicated a decrease in pore diameter from 133 A. to 99 A. Alumina spheres which possess high surface area, in addition to a smaller pore diameter, are especially well suited for utilization as the carrier material for catalytically active metallic components.

The foregoing examples indicate clearly the method of the present invention, and the benefits afforded through the utilization thereof. The examples further indicate that, although the present invention is advantageously employed in preparing refractory inorganic oxide material after the latter has been formed and dried, the benefits resulting from the use of the present invention are greatly enhanced when the undried refractory inorganic oxide material is treated with carbon monoxide.

When the refractory inorganic oxide, prepared in accordance with the previously described method of the present invention, is ultimately employed in the manufacture of catalytic composites, it may be composited with the desired catalytic components immediately after the treatment with carbon monoxide. That is, there need not necessarily be an intermediate step of air-oxidation, at elevated temperatures, prior to impregnating the refractory material with the catalytically active metallic components. Usually, however, the refractory material is not used immediately, but is temporarily stored prior to the impregnating procedure. In such instances, it is common practice to subject the inorganic oxide to a high-temperature calcination treatment, in the presence of air (or other free-oxygen containing gaseous media), for the purpose of insuring substantially completely oxidized refractory material.

Similarly, following the impregnation of the inorganic oxide with the active metallic components, the catalytic composite is generally subjected to high-temperature calcination, in an atmosphere of air, to achieve a substantially completely oxidized composite. In any case, it is intended to be within the scope of the present invention, to prepare a refractory inorganic metal oxide, for ultimate utilization as a carrier material for catalytic composites, through the use of carbon monoxide, either before, or after the inorganic oxide has been subjected to high-temperature calcination.

I claim as my invention:

1. In a process for manufacturing alumina, in which process the alumina is subjected to calcination in the presence of a free oxygen-containing gaseous material, the improvement which comprises contacting the alumina, at a temperature within the range of from about 100° C. to about 600° C., with carbon monoxide prior to the calcination thereof in the presence of said free oxygen-containing gaseous material.

2. A method for manufacturing alumina of improved surface-area characteristics which comprises contacting alumina, at a temperature in excess of 25° C., with carbon monoxide, and thereafter calcining the alumina in the presence of a free oxygen-containing gaseous material and in the absence of carbon monoxide.

References Cited in the file of this patent

UNITED STATES PATENTS 2,465,314    Mosesman ------------ Mar. 22, 1949